July 5, 1966  G. D. KISH  3,259,406
PIPE COUPLING HAVING GASKET WITH SECTIONAL END
Filed Jan. 15, 1964
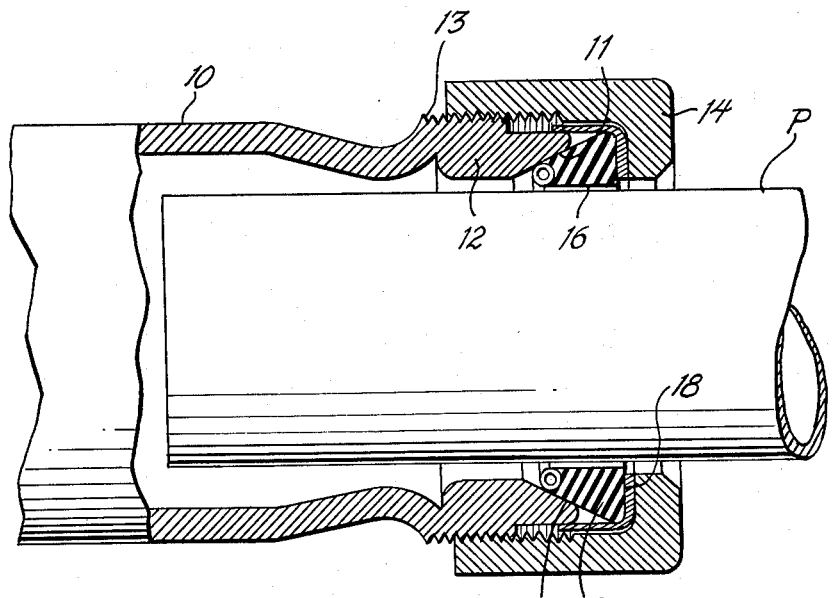
Fig.1.
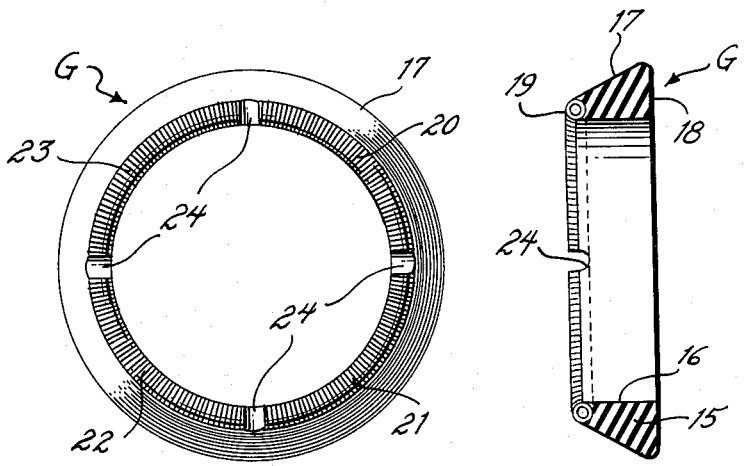
Fig.2.
Fig.3.
INVENTOR.
GEORGE D. KISH United States Patent Office 3,259,406
Patented July 5, 1966

3,259,406
PIPE COUPLING HAVING GASKET WITH SECTIONAL END
George D. Kish, Bradford, Pa., assignor to Dresser Industries, Inc., Dallas, Tex., a corporation of Delaware
Filed Jan. 15, 1964, Ser. No. 337,858
4 Claims. (Cl. 285—341)

The present invention relates to the gaskets that are included as essential elements in a compression pipe coupling and is concerned primarily with the gaskets for small diameter couplings.

A compression coupling comprises a middle ring which is formed with conical walls at points spaced from its ends and these walls define gasket recesses. In couplings of small diameter, such as two inches or less, a follower is screwed onto or into the middle ring at each end and engages the gasket at that end to force it against the adjacent wall. This results in a compression of the gasket about the pipe end which is to be coupled.

In electrically conductive coupling of this type, it has been the practice to embed a ring-like coil of wire in the small end of the gasket and which engages the conical wall. This coil is intended to be forced into good conductive engagement with the pipe by the wedging action of the conical wall and the influence of the follower as it is tightened.

Heretofore, a unitary ring has been embedded in the rubber of the gasket, the rubber entering the interstices of the coil and in the smaller diameter couplings this has interfered with if not completely prevented contraction to the extent necessary to provide a good conductive engagement with the pipe end. It is to be remembered that in many instances, the pipe end will be coated or partially coated with scale, rust, or other impurities and it is necessary for the ring to bite through this coating to achieve the good conducting contact which is so essential.

With the foregoing conditions in mind, the present invention has in view as an important objective the provision of a compression pipe coupling which includes a gasket having a ring structure embedded therein at one end and being provided in two or more sections, the ends of which are spaced apart from adjacent sections. This sectionalized structure provides definite assurance of sufficient contractability to achieve good conductive engagement with the pipe end.

In carrying out the above noted idea in a practical embodiment, the usual ring is embedded in the smaller end of the gasket in the usual way. A cutting tool is then employed to form at least one pair of diametrically opposite cuts to form the spaces between the section ends above mentioned.

A further object of the invention is to provide a gasket of the character aforesaid which is formed with four cuts spaced 90° apart and providing four sections. This number of sections definitely assures of sufficient contraction on the part of the embedded ring.

Various other more detailed objectives and advantages of the invention such as arise in connection with carrying out the above noted ideas in a practical embodiment will in part become apparent and in part be hereinafter stated as a description of the invention proceeds.

The invention therefore comprises a compression pipe coupling including gasket with a conductive ring consisting of at least two sections with the ends of one section being spaced from the ends of adjacent sections.

For a full and more complete understanding of the invention reference may be had to the following description and accompanying drawings, wherein:

FIGURE 1 is a section through one end of a compression coupling including the gasket of this invention before tightening.

FIGURE 2 is a detailed sectional view taken on an enlarged scale of the gasket per se and, FIGURE 3 is a view in end elevation of the gasket.

Referring now to the drawing and first more particularly to FIGURE 1, a pipe to be coupled is therein illustrated and designated P. That half of the coupling which receives the pipe P is depicted as including a middle ring 10 formed with a conical wall 11 from which outwardly extends a cylindrical portion 12 that is externally threaded at 13. A follower 14 is screwed into the threads 13.

It is evident that the conical wall 11 and cylindrical portion 12 define a gasket recess. Received in this recess is a gasket which is referred to in its entirety by the reference character G.

Referring therefore more particularly to FIGURES 2 and 3, the gasket G is shown as comprising a body 15 of rubber composition or other elastomer material commonly employed for gasket purposes. The body 15 has a cylindrical bore 16 slightly greater than the diameter of the pipe P which it receives and an outer conical wall 17 which presents a large flat end surface 18 that is engaged by the follower 14 and a smaller end 19. Embedded in the smaller end 19 are four sections 20, 21, 22, and 23. Each of these sections is separated at each end from adjacent sections by spaces 24.

In manufacturing the gasket G, a complete ring is first embedded in the small gasket end 19. A cutting tool is employed to form the spaces 24 which mark off the sections.

It is evident that when the follower 14 is tightened the ring is subject to the wedging action of the conical wall 11 of the middle ring. This causes it to be compressed or contracted and the ability to do so which ordinarily is provided by the interstices between the turns of the coil is enhanced by the spaces 24. Thus, there is definite assurance that the gasket ring may contract sufficiently to bite through any scale or coating on the pipe P and achieve a good conductive engagement therein.

While a preferred specific embodiment is hereinbefore set forth, it is to be clearly understood that the invention is not to be limited to the exact constructions, mechanisms, and designs illustrated and described because various modifications of these details may be provided in putting the invention into practice within the purview of the appended claims.

What is claimed is:

1. A compression pipe coupling comprising a middle ring defining a substantially conical gasket recess, an annular gasket extending within said recess, said gasket being formed of a body of rubber-like elastomeric material and having a substantially conical shape presenting a smaller tapered end portion extending into said recess, a circular follower including means for wedging said gasket inwardly against the middle ring and the outer surface of a pipe extending therethrough, said gasket having a plurality of exposed metallic ring segments secured thereto at the periphery of its smaller end portion, the continuity of said gasket end portion being interrupted at a plurality of points by notches extending into the body of said material defining spaces between separate segments of the ring structure, thereby to permit constriction of said ring segments into engagement with a pipe when the rubber-like elastomeric body of gasket material is confined under the compressing effect of said wedging within the middle ring.

2. A compression pipe coupling comprising a middle ring defining a substantially conical gasket recess, an annular gasket extending within said recess, said gasket being formed of a body of rubber-like elastomeric material and having a substantially conical shape presenting a smaller tapered end portion extending into said recess, a circular follower including means for wedging said gasket inwardly against the middle ring and the outer surface of a pipe extending therethrough, said gasket having a plurality of separate, exposed, arcuate metallic ring segments fixedly incorporated around the periphery thereof at said smaller end portion, the ends of said segments being separated by open gaps extending partially into said body of rubber-like elastomeric material, thereby to permit constriction of said ring segments into engagement with a pipe when the rubber-like elastomeric body of gasket material is confined under the compressing effect of said wedging within the middle ring.

3. A coupling according to claim 2, wherein the number of said segments is within the range of two to four.

4. A compression pipe coupling comprising a middle ring defining a substantially conical gasket recess, an annular gasket extending within said recess, said gasket being formed of a body of rubber-like elastomeric material and having a substantially conical shape presenting a smaller tapered end portion extending into said recess, a circular follower including means for wedging said gasket inwardly against the middle ring and the outer surface of a pipe extending therethrough, said gasket having a plurality of partially exposed arcuate sections of helically coiled wire embedded in said smaller end portion, with said rubber-like elastomeric material filling the areas within the convolutions thereof, the adjacent ends of said sections of wire being separated by open spaces resulting from removal of said material from said smaller tapered end portion, thereby to permit constriction of said wire into engagement with a pipe when the rubber-like elastomeric body of gasket material is confined under the compressing effect of said wedging within the middle ring.

References Cited by the Examiner

UNITED STATES PATENTS

| | | | |
|---|---|---|---|
| 870,428 | 11/1907 | Graham | 285—342 |
| 1,984,806 | 12/1934 | Pfefferle | 277—235 |
| 2,163,810 | 6/1939 | Raybould | 285—342 X |
| 2,247,031 | 6/1941 | Norton | 277—235 X |
| 2,585,453 | 2/1952 | Gallagher et al. | 285—382.7 X |
| 2,747,899 | 5/1956 | Wiltse | 285—341 |
| 2,755,111 | 7/1956 | Newell et al. | 285—369 X |
| 3,078,332 | 2/1963 | Marx | 285—369 X |
| 3,169,025 | 2/1965 | Borah | 277—235 |

FOREIGN PATENTS 779,959    7/1957    Great Britain.

CARL W. TOMLIN, *Primary Examiner.*

THOMAS F. CALLAGHAN, *Examiner.*